United States Patent
Anthenat

(10) Patent No.: US 12,382,924 B1
(45) Date of Patent: Aug. 12, 2025

(54) APPLICATION OF AUTOMATED DOG FEED AND SOLID MEDICATION DISPENSING SYSTEM

(71) Applicant: Bruce Alan Anthenat, Tijeras, NM (US)

(72) Inventor: Bruce Alan Anthenat, Tijeras, NM (US)

( * ) Notice: Subject to any disclaimer, the term of this patent is extended or adjusted under 35 U.S.C. 154(b) by 0 days.

(21) Appl. No.: 18/666,578

(22) Filed: May 16, 2024

Related U.S. Application Data

(60) Provisional application No. 63/469,014, filed on May 25, 2023.

(51) Int. Cl.
*A01K 5/02* (2006.01)

(52) U.S. Cl.
CPC .......... *A01K 5/0225* (2013.01); *A01K 5/0258* (2013.01); *A01K 5/0291* (2013.01)

(58) Field of Classification Search
CPC ... A01K 5/0225; A01K 5/0258; A01K 5/0291
See application file for complete search history.

(56) References Cited

U.S. PATENT DOCUMENTS

| | | |
|---|---|---|
| 5,129,361 A | 7/1992 | Deutsch |
| 5,340,211 A | 8/1994 | Pratt |
| 5,782,201 A | 7/1998 | Wells |
| 6,520,113 B2 | 2/2003 | Van Den Berg |
| 6,615,764 B2 | 9/2003 | Voogd |
| 6,619,228 B2 | 9/2003 | Voogd |
| 6,651,585 B2 | 11/2003 | Van Den Berg |
| 7,240,807 B2 * | 7/2007 | Hoff ..................... G01G 13/026  222/77 |
| 7,263,899 B2 | 9/2007 | Luehrs |
| 7,426,901 B2 | 9/2008 | Turner |
| 8,936,389 B2 | 1/2015 | Bachman |
| 9,648,848 B2 | 5/2017 | Weelink |
| 10,091,972 B1 | 10/2018 | Jensen |
| 10,463,024 B2 | 11/2019 | Huisma |
| 2003/0061996 A1 | 4/2003 | Voogd |
| 2005/0284386 A1 * | 12/2005 | Eversole ................. A01K 5/02  119/57.1 |

(Continued)

*Primary Examiner* — Ebony E Evans
(74) *Attorney, Agent, or Firm* — QuickPatents; Kevin Prince

(57) ABSTRACT

An automated dispensing apparatus for providing food and medication to pets, includes a base supporting a feed assembly with an auger chute and motor-driven auger, and a storage bin positioned above to supply food. A medication feed assembly features a holder and a dispensing plate, controlled by an actuator, to deliver medication to a food bowl located below the dispensing ends. The apparatus is managed by a control circuit equipped with a CPU, memory, and wireless communication capabilities, allowing remote programming and adjustment of feeding and medication schedules via a remote electronic device, such as a smart phone. Additionally, a camera and lighting system are integrated for monitoring the dispensing process. The apparatus can be powered by a rechargeable battery, AC adapter, or solar cells, ensuring continuous operation. This system provides a reliable and automated solution for feeding and medicating pets, suitable for both indoor and outdoor use.

15 Claims, 5 Drawing Sheets

(56) References Cited

U.S. PATENT DOCUMENTS

| | | | |
|---|---|---|---|
| 2011/0295416 A1* | 12/2011 | Aquilonius | A61J 7/0076 221/98 |
| 2013/0110282 A1* | 5/2013 | Omura | G16H 20/13 700/233 |
| 2013/0199450 A1 | 8/2013 | Harty, Sr. | |
| 2017/0079236 A1* | 3/2017 | Womble | A01K 15/025 |
| 2017/0354119 A1 | 12/2017 | Dewey | |
| 2018/0368358 A1 | 12/2018 | Morin | |
| 2019/0105623 A1 | 4/2019 | Harrington | |
| 2019/0230900 A1 | 8/2019 | Felipe | |
| 2021/0127630 A1* | 5/2021 | Zimmerman | G08C 17/00 |
| 2022/0232800 A1 | 7/2022 | Harsh | |

* cited by examiner

APPLICATION OF AUTOMATED DOG FEED AND SOLID MEDICATION DISPENSING SYSTEM

CROSS REFERENCE TO RELATED APPLICATIONS

This application claims the benefit of U.S. Provisional Patent Application 63/469,014, filed on May 25, 2023, and incorporated herein by reference.

STATEMENT REGARDING FEDERALLY SPONSORED RESEARCH AND DEVELOPMENT

Not Applicable.

FIELD OF THE INVENTION

This invention relates to dispensing, and more particularly to an automated dog food and medication dispenser.

BACKGROUND

Prior art in the field of automated pet feeding systems primarily utilizes a "puck" design, where the dispensing mechanism revolves around a vertical axis. This design inherently limits the size of the dry solid food that can be dispensed, typically not exceeding 0.7 inches in diameter. Such a limitation is not conducive to feeding larger dog breeds, which often require larger and more substantial food portions. Additionally, the puck-based systems have small capacity storage hoppers, generally holding only a few liters of food. This small capacity necessitates frequent refilling, which is impractical for pet owners who may be away for extended periods.

Moreover, existing technologies do not offer integrated solutions for dispensing solid medications alongside food. Pet owners with animals requiring regular medication must provide it separately, which is not always feasible during long absences. The lack of automation in medication dispensing in current systems means that pets may miss necessary doses, potentially compromising their health.

The deficiencies of the current technology highlight several drawbacks. The limited food size and storage capacity are significant constraints, making these systems unsuitable for larger breeds or for owners needing a more hands-off approach. Additionally, the absence of an integrated medication dispensing feature adds an extra layer of complexity and potential error in managing pet health care.

An ideal invention would address these issues by providing a system capable of dispensing larger food sizes and offering a significantly larger storage capacity. It would also benefit from an integrated mechanism for automatically dispensing medications at predetermined times, ensuring that pets receive their treatments consistently and reliably, even in the owner's absence. Such a system would offer a comprehensive solution that supports the health and well-being of pets while accommodating the lifestyle needs of their owners. The present invention accomplishes these objectives.

SUMMARY OF THE INVENTION

The invention pertains to an automated dispensing apparatus designed for dispensing both food and medication to pets, specifically targeting larger dog breeds. The apparatus comprises a base supporting a feed assembly with an auger chute and an auger assembly, which includes a motor and an auger. Above this assembly, a storage bin is positioned to supply food to the gravity feed unit of the feed assembly.

Additionally, the apparatus features a medication feed assembly that includes a medication holder and a dispensing plate, which is maneuvered by an actuator. The dispensing plate is designed to capture medication and transport it to a forward end of the medication feed assembly, from where it drops into a food bowl positioned below the dispensing ends of both the auger chute and the medication feed assembly. The food bowl is designed to be detachable for ease of cleaning.

The apparatus is controlled by a control circuit that includes components such as a power source, a CPU, non-volatile memory, and an actuator controller. This circuit is responsible for managing the operation of the motor and the actuator based on a programmed feeding and medication dispensing schedule. Communication capabilities are provided by a wireless module that connects to a remote electronic device, enabling remote setting and adjustment of the dispensing schedules.

For monitoring and operational purposes, the apparatus includes a camera and lighting system to record and illuminate the dispensing process. The power supply to the control circuit can be maintained through a rechargeable battery, an AC adapter, or a solar charging system.

This automated dispensing apparatus is particularly advantageous for pet owners who need a reliable solution to feed their pets and administer medication automatically and remotely, ensuring that the pets are fed and medicated even in the owner's absence. The system is designed to be robust and user-friendly, accommodating the needs of larger dog breeds and suitable for both indoor and outdoor environments.

The present invention effectively resolves the drawbacks of the prior art by introducing a system capable of dispensing larger food sizes and featuring a substantially increased storage capacity. It also incorporates an integrated mechanism for automatically dispensing medications at predetermined times. This ensures that pets receive their necessary treatments consistently and reliably, even when the owner is not present. The invention provides a comprehensive solution that not only supports the health and well-being of pets but also accommodates the lifestyle needs of their owners, addressing the limitations and challenges posed by prior art. Other features and advantages of the present invention will become apparent from the following more detailed description, taken in conjunction with the accompanying drawings, which illustrate, by way of example, the principles of the invention.

DETAILED DESCRIPTION OF THE PREFERRED EMBODIMENT

Illustrative embodiments of the invention are described below. The following explanation provides specific details for a thorough understanding of and enabling description for these embodiments. One skilled in the art will understand that the invention may be practiced without such details. In other instances, well-known structures and functions have not been shown or described in detail to avoid unnecessarily obscuring the description of the embodiments.

Unless the context clearly requires otherwise, throughout the description and the claims, the words "comprise," "comprising," and the like are to be construed in an inclusive sense as opposed to an exclusive or exhaustive sense; that is to say, in the sense of "including, but not limited to." Words using the singular or plural number also include the plural or singular number respectively. Additionally, the words "herein," "above," "below" and words of similar import, when used in this application, shall refer to this application as a whole and not to any particular portions of this application. When the claims use the word "or" in reference to a list of two or more items, that word covers all of the following interpretations of the word: any of the items in the list, all of the items in the list and any combination of the items in the list. When the word "each" is used to refer to an element that was previously introduced as being at least one in number, the word "each" does not necessarily imply a plurality of the elements, but can also mean a singular element.

Figure 1:
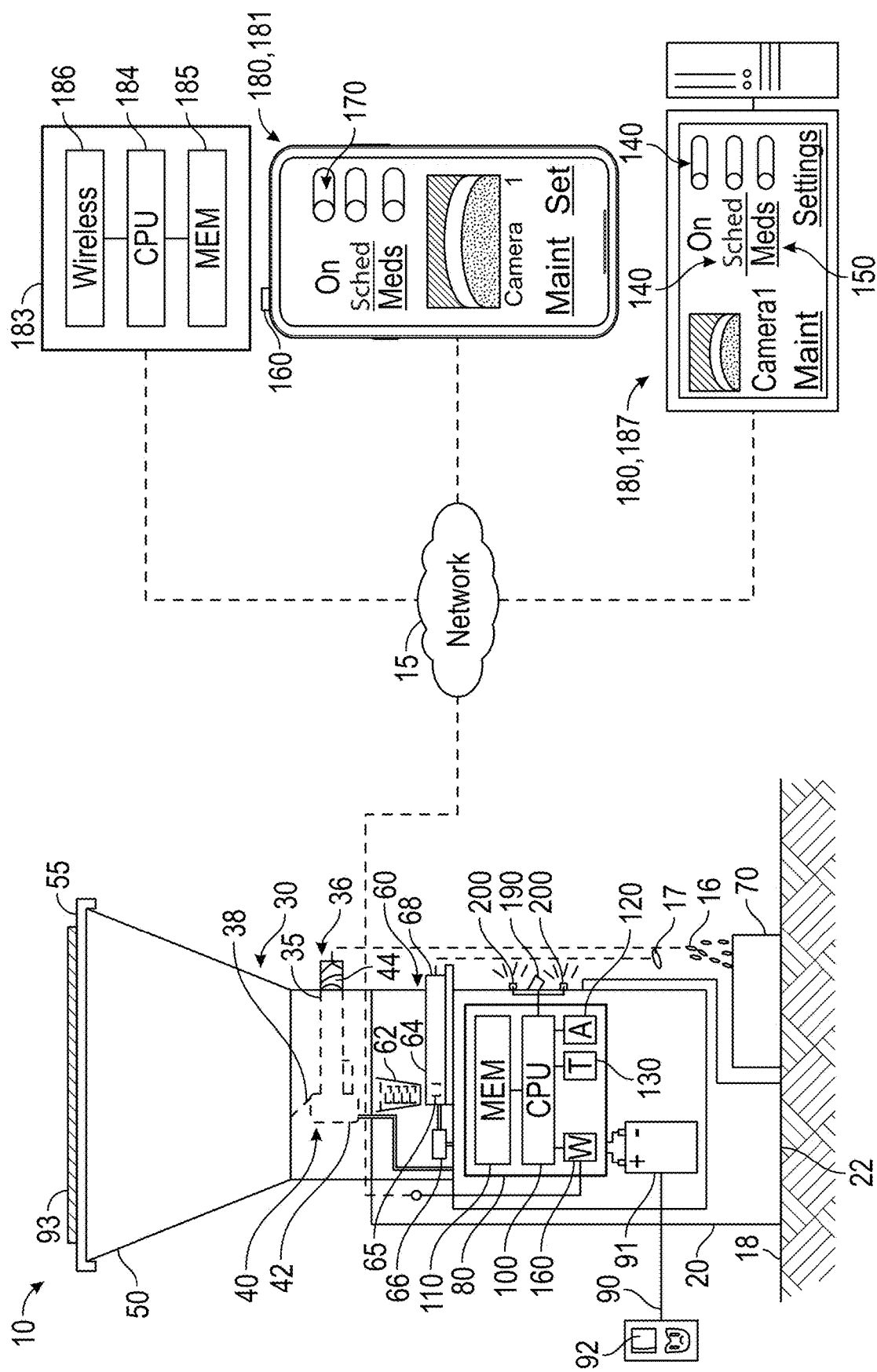
FIG. 1 is a system diagram of the invention, illustrating a dispensing apparatus and its connections to remote electronic devices.
Figure 2:
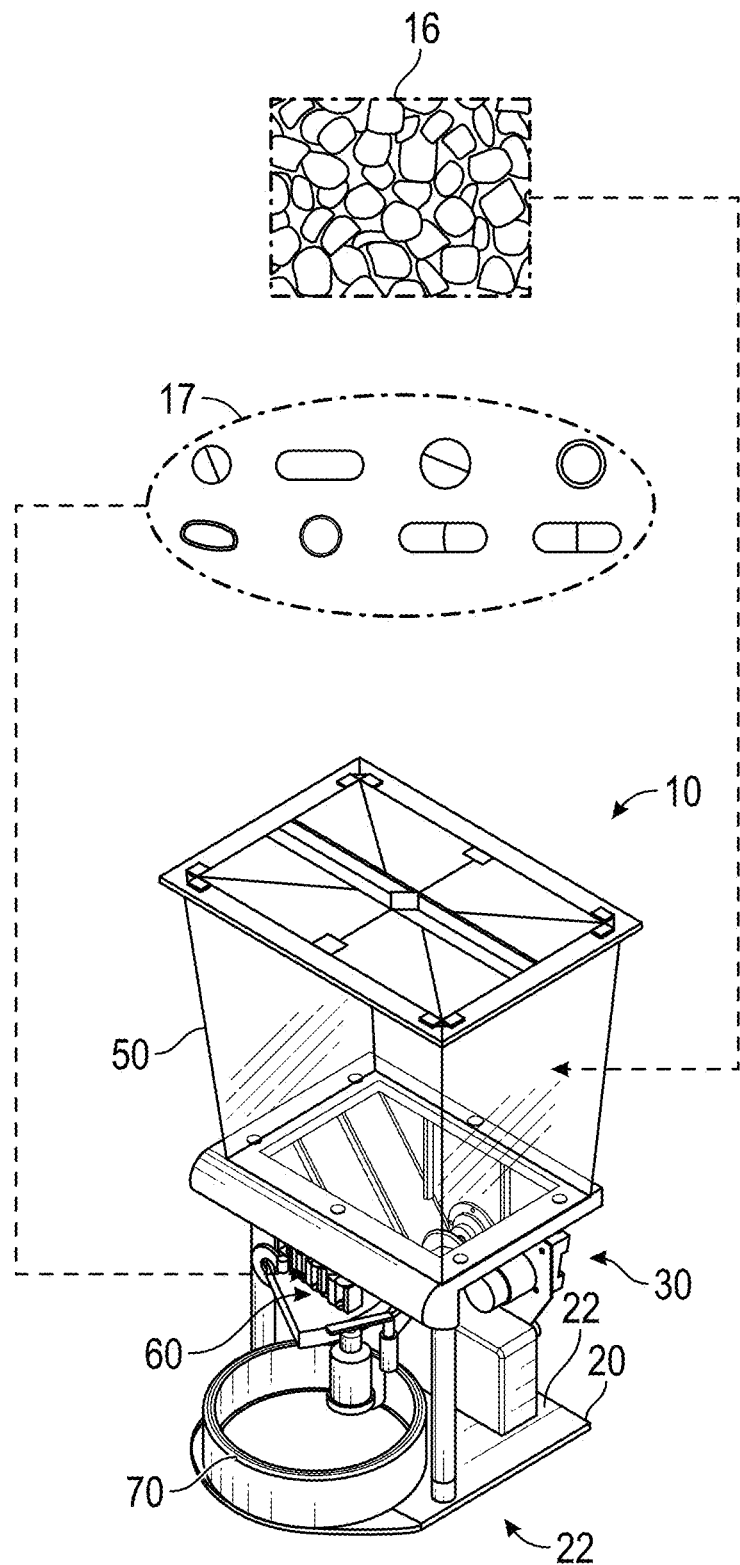
FIG. 2 is a perspective view of the invention, illustrating sample food and medication that can be stored in and dispensed by the invention.
Figure 3:
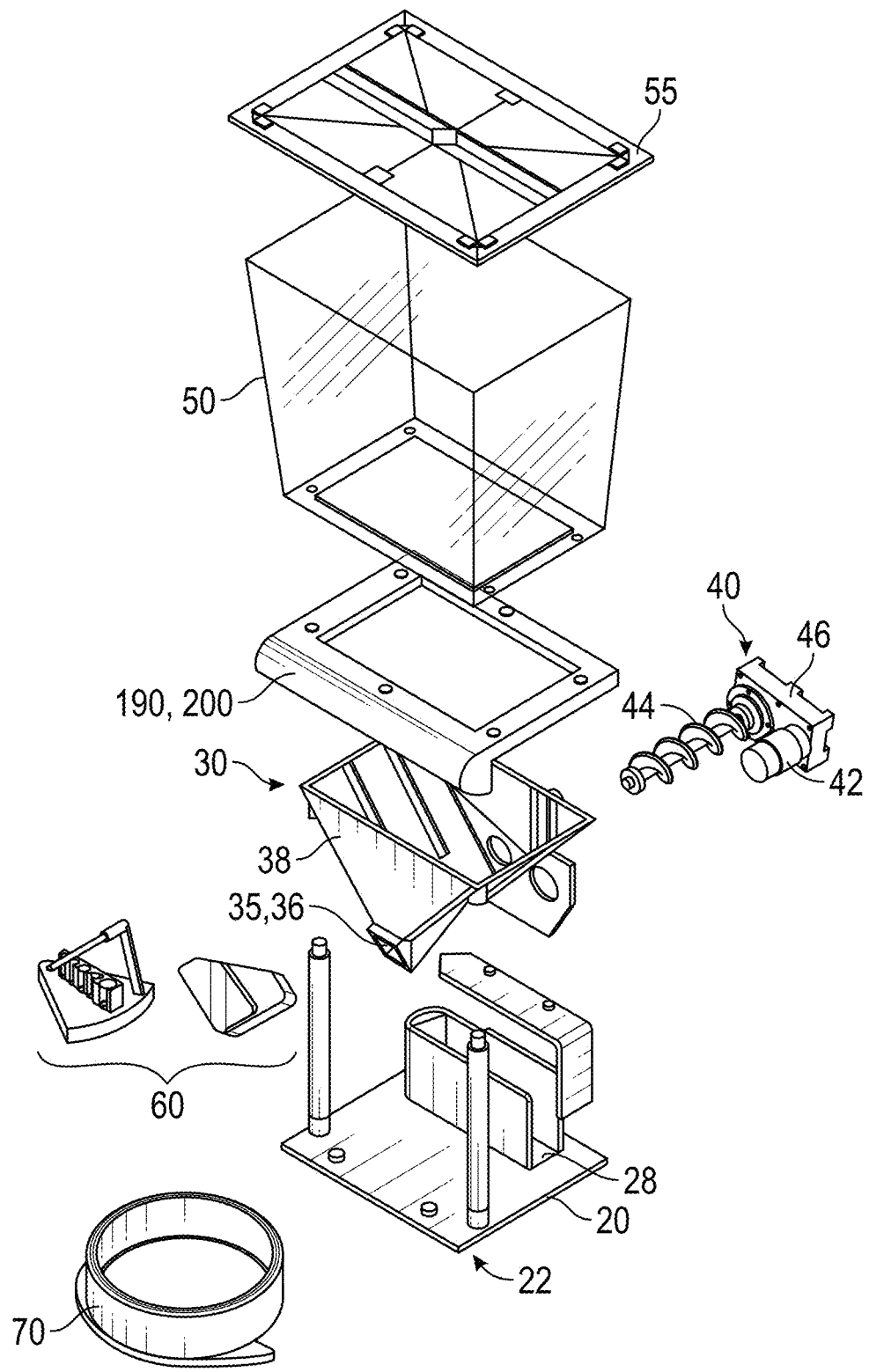
FIG. 3 is an exploded perspective view of the apparatus.

FIGS. 1-3 illustrate an automated dispensing apparatus 10 for dispensing food 16 and medication 17 to a pet. The apparatus 10 comprises a base 20 having a bottom side 22 configured for resting on a horizontal surface 18, and a top side 28.

Figure 4:
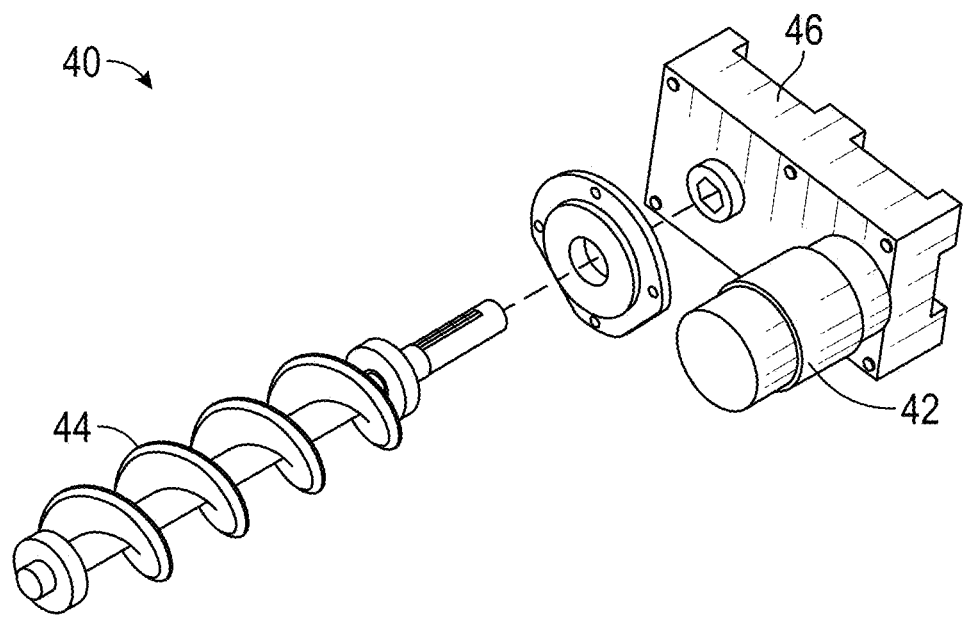
FIG. 4 is an exploded perspective view of an auger assembly of the apparatus.
Figure 5:
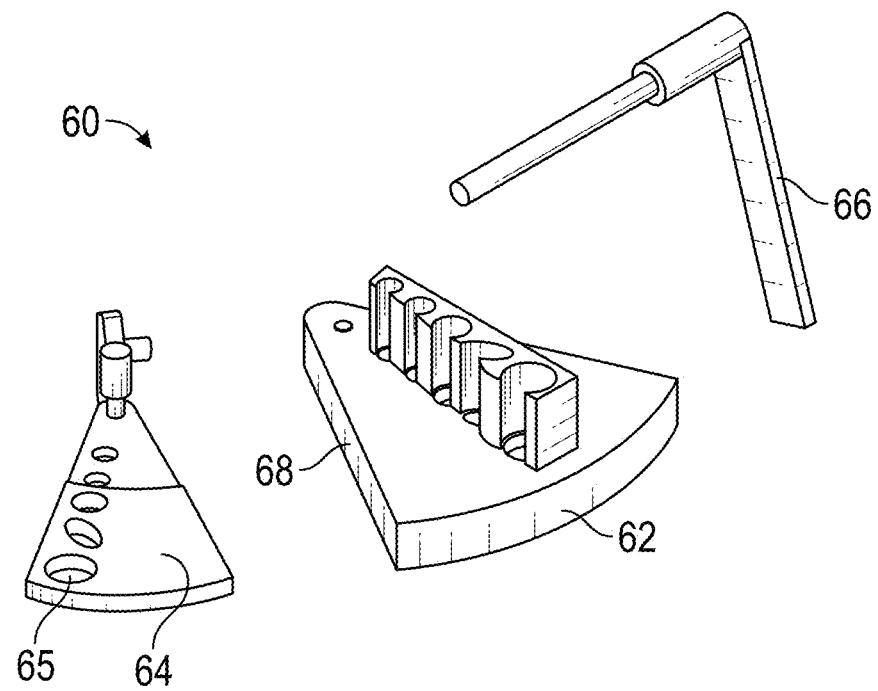
FIG. 5 is an exploded perspective view of a medication feed assembly of the apparatus.

A feed assembly 30 is fixed with the top side 28 of the base 20 and includes an auger chute 35 disposed below a gravity feed unit 38. The auger chute 35 includes an open dispensing end 36. An auger assembly 40 (FIG. 4) is fixed with the feed assembly 30, which includes at least a motor 42 and an auger 44, the auger 44 being rotationally captured within the auger chute 35 of the feed assembly 30. A storage bin 50 is disposed above the feed assembly 30 and configured to deliver the food 16 to the gravity feed unit 38.

A medication feed assembly 60 includes a medication holder 62, a dispensing plate 64 disposed below the medication holder 62, and an actuator 66 (FIGS. 1-3 and 5) configured for moving the dispensing plate 64 relative to the medication holder 62. The dispensing plate 64 includes at least one medication aperture 65 configured for capturing the medication 17 when disposed below the medication holder 62 and moving the medication 17 to a forward end 68 of the medication feed assembly 60 when the actuator 66 is actuated.

A food bowl 70 is disposed below the open dispensing end 36 of the auger chute 35 and the forward end 68 of the medication feed assembly 60. With the food 16 placed in the storage bin 50 and with the medication 17 stored within the medication holder 62, actuation of the actuator 66 causes the dispensing plate 64 to move the medication 17 from the medication holder 62 to the forward end 68 of the medication feed assembly 60 to drop into the food bowl 70, and actuation of the motor 42 causes the auger 44 to move food 16 through the auger chute 35 to the dispensing end 36 to drop into the food bowl 70.

Optionally, the food bowl 70 is selectively detachable from the base 20, whereby the food bowl 70 may be manually removed for cleaning. This feature allows for easy maintenance and ensures hygiene for the pet.

Figure 6:
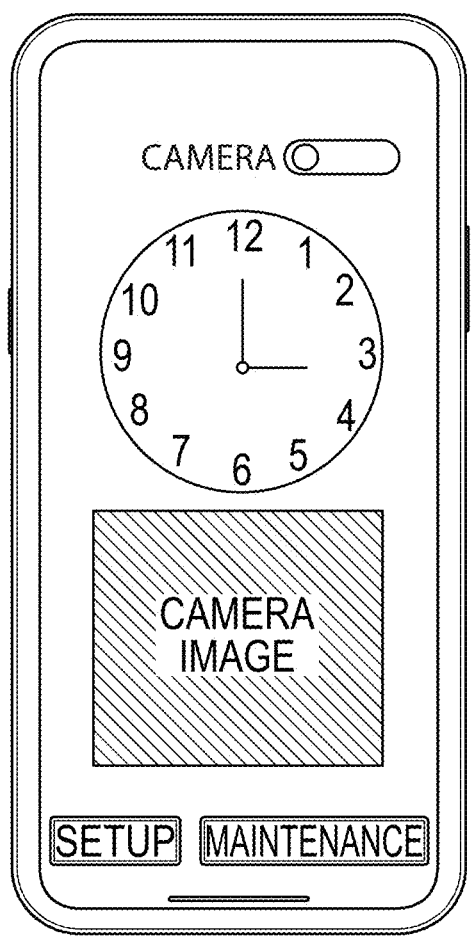
FIG. 6 is an example graphic user interface for a software application running on a remote electronic device and in communication with a control circuit of the apparatus.

Further, the dispensing apparatus 10 may include a control circuit 80 that comprises at least a power source 90, a CPU 100, a non-volatile memory 110, an actuator controller 120 configured to turn on and off the motor 42 to dispense the food 16 through the auger assembly 40 and to actuate the medication feed assembly actuator 66, a timing circuit 130 for providing a scheduled feeding program 140 and a scheduled medication dispensing program 150, and a wireless module 160 for communicating through a wireless network 15 to a remote electronic device 180 that includes a user interface 170 (FIGS. 1 and 6) for at least setting the scheduled feeding program 140 and the scheduled medication dispensing program 150, and operating the auger motor 42 and the medication actuator 66. The remote electronic device could be a wireless smart phone 181 running a software application 182 that interfaces with the control circuit 80 through the wireless module 160 and the wireless network 15, or a server 183 in communication with the wireless network 15, the server including at least a CPU 184, a non-volatile storage 185, and a networking module 186, the user interface 170 of the server 180 being displayed on a remote terminal 187 through the network 15, for example.

Additionally, the dispensing apparatus 10 may further include a camera 190 electrically controlled by the control circuit 80, and at least one lamp 200 for illuminating the food bowl 70, the open dispensing end 36 of the auger chute 35, and the forward end 68 of the medication feed assembly 60. The control circuit 80 is configured to activate the at least one lamp 200, such as one or more LEDs 200, and camera 190 to record video of the food 16 and medication 17 being dispensed and then consumed by the pet, and sending the recorded video to the remote electronic device 180. The at least one lamp 200 and camera 190 are active for either a predetermined period of time as administered by the control circuit 80, or when the control circuit 80 detects no more movement based on data from the camera 190.

The auger assembly 40 may further include a gearbox 46 (FIG. 5) mechanically disposed between the motor 42 and the auger 44. The storage bin 50 may have a capacity of at least 40 liters and further includes an open top end 58 through which the storage bin 50 may be restocked with the food 16, and a selectively attachable cover 55 to seal the open top end 58 of the storage bin 50.

The power source 90 may include a rechargeable battery 91, an AC adapter 92 for delivering power to the control circuit 80 and the rechargeable battery 91 through a conventional wall power outlet, or at least one solar charging system 93 for delivering power to the control circuit 80 and rechargeable battery 91.

The control circuit 80 is further configured to allow a dispensing volume of the food 16 to be adjusted through the user interface 170 of the remote electronic device 180, and to maintain a maintenance schedule in its non-volatile memory 110 and to display the maintenance schedule and a maintenance status on the user interface 170 of the remote electronic device 180.

In a preferred embodiment of the invention, the storage bin 50 is designed to handle dry solid feed 16 as typically found in dog food 16, with a capacity of not less than 40 liters, ensuring extended duration between refills. This large capacity is particularly beneficial for larger breeds such as an 80-pound Labrador Retriever, which might consume approximately 0.5 liters of food per day, allowing for approximately 80 days between storage bin 50 refilling.

The auger 44 preferably includes a horizontal feed screw 44 driven by the gearbox 46, which is in turn driven by the electric motor 42. This configuration produces significant torque sufficient to transfer various sizes of dry solid dog feed 16 up to 1 inch in diameter or other irregular shapes from the storage bin 50 to the food bowl 70.

The medication feed assembly 60 is capable of dispensing solid medications 17 such as tablets, pills, or capsules in an automated and unattended manner, either at feeding times or separately. The control circuit 80 is preferably powered by a 12 Volt Direct Current (12 VDC) battery 91, which is maintained by a 115 Volt Alternating Current (115 VAC) supply through an AC adapter 92 or by a 12 VDC solar charging system 93, ensuring reliable operation even during power outages.

The food bowl 70 preferably has a minimum capacity of not less than 2 liters and is removable for easy cleaning. The entire system is controlled via the control circuit 80, which can be programmed through the mobile or smart phone 181 or the computer interface 170 through the server 183, allowing the user to set feeding and medication dispensing schedules through the user interface 170 of the remote electronic device 180. This detailed configuration represents a preferred embodiment of the invention, designed to offer reliable, efficient, and automated feeding and medication dispensing for pets, particularly suitable for larger dog breeds and outdoor environments.

While a particular form of the invention has been illustrated and described, it will be apparent that various modifications can be made without departing from the spirit and scope of the invention. Accordingly, it is not intended that the invention be limited, except as by the appended claims.

Particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific embodiments disclosed in the specification, unless the above Detailed Description section explicitly defines such terms. Accordingly, the actual scope of the invention encompasses not only the disclosed embodiments, but also all equivalent ways of practicing or implementing the invention.

The above detailed description of the embodiments of the invention is not intended to be exhaustive or to limit the invention to the precise form disclosed above or to the particular field of usage mentioned in this disclosure. While specific embodiments of, and examples for, the invention are described above for illustrative purposes, various equivalent modifications are possible within the scope of the invention, as those skilled in the relevant art will recognize. Also, the teachings of the invention provided herein can be applied to other systems, not necessarily the system described above. The elements and acts of the various embodiments described above can be combined to provide further embodiments.

All of the above patents and applications and other references, including any that may be listed in accompanying filing papers, are incorporated herein by reference. Aspects of the invention can be modified, if necessary, to employ the systems, functions, and concepts of the various references described above to provide yet further embodiments of the invention.

Changes can be made to the invention in light of the above "Detailed Description." While the above description details certain embodiments of the invention and describes the best mode contemplated, no matter how detailed the above appears in text, the invention can be practiced in many ways. Therefore, implementation details may vary considerably while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated.

While certain aspects of the invention are presented below in certain claim forms, the inventor contemplates the various aspects of the invention in any number of claim forms. Accordingly, the inventor reserves the right to add additional claims after filing the application to pursue such additional claim forms for other aspects of the invention.

What is claimed is:

1. A dispensing apparatus for dispensing food and medication to a pet, comprising:
    a base having a bottom side configured for resting on a horizontal surface, and a top side;
    a feed assembly fixed with the top side of the base and including an auger chute disposed below a gravity feed unit, the auger chute including an open dispensing end;
    an auger assembly fixed with the feed assembly, the auger assembly including at least a motor and an auger, the auger rotationally captured within the auger chute of the feed assembly;
    a storage bin disposed above the feed assembly and configured to deliver the food to the gravity feed unit;
    a medication feed assembly including a medication holder, a dispensing plate disposed below the medication holder, and an actuator configured for moving the dispensing plate relative the medication holder, the dispensing plate including at least one medication aperture configured for capturing the medication when disposed below the medication holder and moving the medication to a forward end of the medication feed assembly when the actuator is actuated; and
    a food bowl disposed below the open dispensing end of the auger chute and the forward end of the medication feed assembly;
    whereby with the food placed in the storage bin and with the medication stored within the medication holder, actuation of the actuator causes the dispensing plate to move the medication from the medication holder to the forward end of the medication feed assembly to drop into the food bowl, and actuation of the motor causes the auger to move food through the auger chute to the dispensing end to drop into the food bowl.

2. The dispensing apparatus of claim 1 wherein the food bowl is selectively detachable from the base, whereby the food bowl may be manually removed for cleaning.

3. The dispensing apparatus of claim 1 further including a control circuit that includes at least a power source, a CPU, a non-volatile memory, an actuator controller configured to turn on and off the motor to dispense the food through the auger assembly and to actuate the medication feed assembly actuator, a timing circuit for providing a scheduled feeding program and a scheduled medication dispensing program, and a wireless module for communicating through a wireless network to a remote electronic device that includes a user interface for at least setting the scheduled feeding program and the scheduled medication dispensing program, and operating the auger motor and the medication actuator.

4. The dispensing apparatus of claim 3 wherein the remote electronic device is a wireless smart phone running a software application that interfaces with the control circuit through the wireless module and the wireless network.

5. The dispensing apparatus of claim 3 wherein the remote electronic device is a server in communication with the wireless network, the server including at least a CPU, a non-volatile storage, and a networking module, whereby the server interacts with the control circuit through the wireless module and the networking module.

6. The dispensing apparatus of claim 3 further including a camera electrically controlled by the control circuit, and at least one lamp for illuminating the food bowl, the open dispensing end of the auger chute, and the forward end of the medication feed assembly, whereby the control circuit is configured to activate the at least one lamp and camera to record video of the food and medication being dispensed and then consumed by the pet, and sending the recorded video to the remote electronic device.

7. The dispensing apparatus of claim 3 wherein the power source includes a rechargeable battery.

8. The dispensing apparatus of claim 7 wherein the power source includes an AC adapter for delivering power to the control circuit and the rechargeable battery through a conventional wall power outlet.

9. The dispensing apparatus of claim 7 wherein the power source includes at least one solar charging system for delivering power to the control circuit and rechargeable battery.

10. The dispensing apparatus of claim 3 wherein the control circuit is further configured to allow a dispensing volume of the food to be adjusted through the user interface of the remote electronic device.

11. The dispensing apparatus of claim 3 wherein the control circuit is further configured to maintain a maintenance schedule in its non-volatile memory and to display the maintenance schedule and a maintenance status on the user interface of the remote electronic device.

12. The dispensing apparatus of claim 1 wherein the auger assembly further includes a gearbox mechanically disposed between the motor and the auger.

13. The dispensing apparatus of claim 1 wherein the storage bin has a capacity of at least 40 liters.

14. The dispensing apparatus of claim 1 wherein the storage bin further includes an open top end through which the storage bin may be restocked with the food, and a selectively attachable cover to seal the open top end of the storage bin.

15. A dispensing apparatus for dispensing food and medication to pets, comprising:
 a base having a bottom side configured for resting on a horizontal surface, and a top side;
 a feed assembly fixed with the top side of the base and including an auger chute disposed below a gravity feed unit, the auger chute including an open dispensing end;
 an auger assembly fixed with the feed assembly, the auger assembly including at least a motor and an auger, the auger rotationally captured within the auger chute of the feed assembly;
 a storage bin disposed above the feed assembly and configured to deliver the food to the gravity feed unit;
 a medication feed assembly including a medication holder, a dispensing plate disposed below the medication holder, and an actuator configured for moving the dispensing plate relative to the medication holder, the dispensing plate including at least one medication aperture configured for capturing the medication when disposed below the medication holder and moving the medication to a forward end of the medication feed assembly when the actuator is actuated;
 a food bowl disposed below the open dispensing end of the auger chute and the forward end of the medication feed assembly;
 a control circuit that includes at least a power source, a CPU, a non-volatile memory, an actuator controller configured to turn on and off the motor to dispense the food through the auger assembly and to actuate the medication feed assembly actuator, a timing circuit for providing a scheduled feeding program and a scheduled medication dispensing program, and a wireless module for communicating through a wireless network to a remote electronic device that includes a user interface for at least setting the scheduled feeding program and the scheduled medication dispensing program, and operating the auger motor and the medication actuator;
 a camera electrically controlled by the control circuit, and at least one lamp for illuminating the food bowl, the open dispensing end of the auger chute, and the forward end of the medication feed assembly;
 the auger assembly further includes a gearbox mechanically disposed between the motor and the auger;
 the storage bin further includes an open top end through which the storage bin may be restocked with the food, and a selectively attachable cover to seal the open top end of the storage bin;
 the power source includes a rechargeable battery;
 the power source includes an AC adapter for delivering power to the control circuit and the rechargeable battery through a conventional wall power outlet;
 the control circuit is further configured to allow a dispensing volume of the food to be adjusted through the user interface of the remote electronic device; and
 the control circuit is further configured to maintain a maintenance schedule in its non-volatile memory and to display the maintenance schedule and a maintenance status on the user interface of the remote electronic device;
 whereby with the food placed in the storage bin and with the medication stored within the medication holder, actuation of the actuator causes the dispensing plate to move the medication from the medication holder to the forward end of the medication feed assembly to drop into the food bowl, and actuation of the motor causes the auger to move food through the auger chute to the dispensing end to drop into the food bowl, the at least one lamp and camera becoming active with each such actuation for a predetermined period of time.

* * * * *